United States Patent [19]

Kunda et al.

[11] Patent Number: 4,755,453
[45] Date of Patent: Jul. 5, 1988

[54] METHOD FOR RECOVERING SILVER FROM WASTE SOLUTIONS CONTAINING THIOSULFATE COMPOUNDS

[75] Inventors: Wasyl Kunda; Thomas H. Etsell, both of Edmonton, Canada

[73] Assignee: The Governors of the University of Alberta, Alberta, Canada

[21] Appl. No.: 910,719

[22] Filed: Sep. 24, 1986

[30] Foreign Application Priority Data

Jun. 11, 1986 [CA] Canada .................................. 511317

[51] Int. Cl.$^4$ .......................... C22B 11/00; G03C 5/24
[52] U.S. Cl. .................................. 430/398; 75/118 P; 210/721; 210/737; 210/749; 210/766; 210/912; 423/23; 430/399; 430/400
[58] Field of Search ........................ 430/398, 399, 400; 210/749, 766, 912, 721, 737; 75/118 P; 423/23

[56] References Cited

U.S. PATENT DOCUMENTS

| | | | |
|---|---|---|---|
| 2,060,539 | 4/1928 | Spies | 75/118 P |
| 3,537,986 | 11/1970 | Watanabe et al. | 210/912 |
| 3,982,932 | 9/1976 | Korosi | 430/398 |
| 4,437,889 | 3/1984 | Palacios-Mendoza | 78/118 P |
| 4,585,561 | 4/1986 | Zlokarnik et al. | 430/398 |

FOREIGN PATENT DOCUMENTS

| | | | |
|---|---|---|---|
| 0608116 | 5/1978 | U.S.S.R. | 78/118 P |
| 0611168 | 6/1978 | U.S.S.R. | 78/118 P |
| 1191876 | 11/1985 | U.S.S.R. | 78/118 P |

Primary Examiner—Mukund J. Shah
Attorney, Agent, or Firm—Sughrue, Mion, Zinn, Macpeak & Seas

[57] ABSTRACT

In a process for recovering silver from spent photographic treatment solution comprises mixing nitric acid with a quantity of the treatment solution to precipitate from the solution silver sulfide. The silver sulfide may be then converted to pure silver. The improvement comprises mixing less than two parts of concentrated nitric acid solution with more than ten parts of the treatment solution to precipitate out of solution silver sulfide. The solution is filtered to remove the silver sulfide precipitate from the solution to yield a solid residue which includes silver sulfide.

14 Claims, 6 Drawing Sheets

METHOD FOR RECOVERING SILVER FROM WASTE SOLUTIONS CONTAINING THIOSULFATE COMPOUNDS

FIELD OF THE INVENTION

This invention relates to a process for recovering silver from spent photographic treatment solutions.

BACKGROUND OF THE INVENTION

Figure 1:
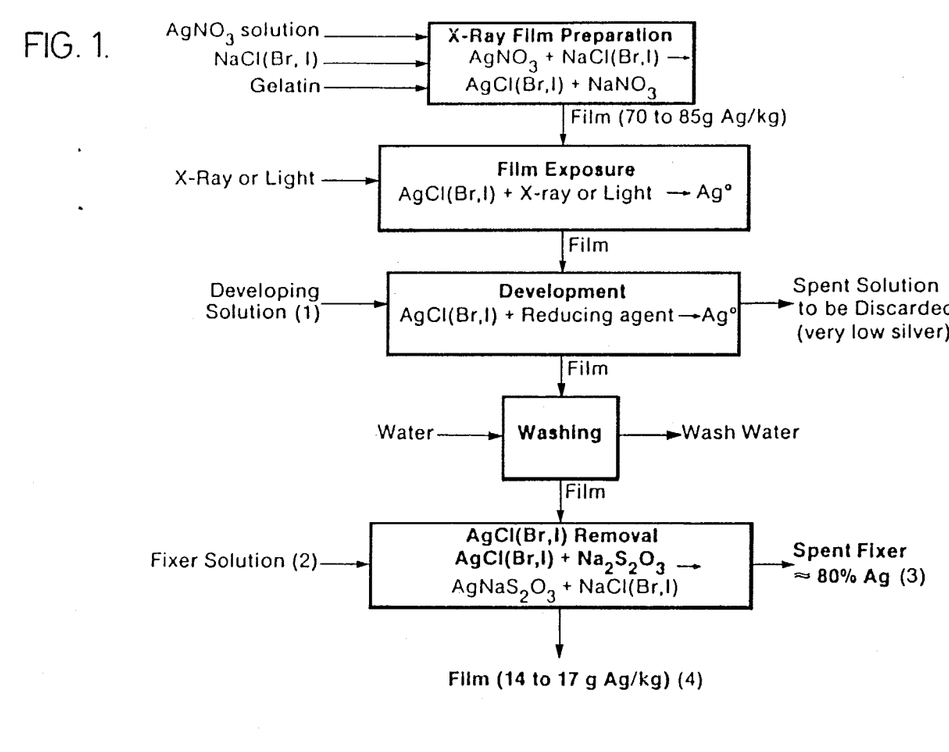
FIG. 1 is a flow chart of the process of developing x-ray film.

The photographic film industry in the United States and Canada consumes 1,555 tonnes and 466 tonnes, respectively of silver per year. About 35% of this silver is used for manufacturing x-ray film for which hospitals and medical clinics are the primary consumers. The manufacture and processing of x-ray film is described in the literature (The Manual of Photography, 1978) and is summarized in FIG. 1. In this flow sheet, the silver halide crystals are deposited on a base, usually comprised of polystyrene, polyester or polyethylene terephthalate. During the processing of x-ray film, the silver halide emulsion is exposed to radiation or light causing the reduction of a small fraction of silver halide to silver metal thereby forming a latent image of the subject. Subsequently, the film is treated with developing solution to activate the reduced nuclei of silver and promote the further reduction of silver halide until the latent image becomes visible. Finally, the developed film is treated with fixed solution to remove the unreduced silver halides.

The original x-ray film contains 7% to 8% Ag. During processing, about 80% of the silver is removed in the fixer solution and 20% remains with the film.

The recovery of silver from waste or spent solutions and materials has been studied by many researchers.

1. Aliotta, J. (1982) Silver Recovery and Refining from Solutions. In: M. I. El Guindy (Ed.), *Precious Metals 1982*, Proc. Sixth Internat. Prec. Metals Inst. Conf., Newport Beach, Calif., June 7-11, 1982, Pergamon Press, Toronto, pp. 597-601.
2. American Hospital Association (1980), "Silver Recovery for Hospitals", 29 pp.
3. Dannenberg, P. R. and J. M. Potter (1968). Silver Recovery from Waste Photographic Solutions by Metallic Displacement. *U.S. Bur. Mines Report of Investigation* 7117.
4. Eastman Kodak Company (1976). Recovering Silver from Photographic Materials. Pamphlet p. 10.
5. Kunda, W. (1981a) Treatment of Complex Silver Arsenide Concentrate in Nitric Acid System. In: R. O. McGachie and A. G. Bradley (Ed.), *Precious Metals*, Proc. Fourth Internat. Prec. Metals, Inst. Conf. Toronto, June, 1980, Pergamon Press, Toronto, pp. 39-57; *Can. J. Chem Eng.* 59, 347-56.
6. Kunda, W. (1981b), Hydrometallurgical Process for Recovery of Silver from Silver Bearing Materials. *Hydrometallurgy*, 7, 77-97.
7. Kunda, W. (1984a). Processing of Photographic Spent Solution by Chemical Method. In: D. A. Reese (Ed.), *Precious Metals 1983*, Proc. Seventh Internat. Prec. Metals Inst. Conf., San Francisco, June 12-16, 1983, Pergamon Press, Toronto, pp. 185-95.
8. Kunda, W. and T. H. Etsell (1986). Recovery of Silver from X-ray Film. In: E. D. Zysk and J. A. Bonucci (Ed.), *Precious Metals 1985*, Proc. Ninth Internat. Prec. Metals Inst. Conf., New York, June 10-13, 1985, IPMI Press, Allentown, Pa. pp. 289-304.
9. Kunda, W. (1984b). Hydrometallurgical Processing of Silver Concentrate. In: V. Kudryk, D. A. Corrigan and W. W. Liang (Ed.), *Precious Metals: Mining, Extraction and Processing*, Met. Soc. AIME, Warrendale, Pa., pp. 397-423.
10. Kunda, W., B. Rudyk and H. Veltman, Recovery of Elemental Sulphur from Sulphur Bearing Materials. Presented at Can. Sulphur Symp., Calgary, May 30-31, 1974, 12 pp.
11. The Manual of Photography (1978), 7th ed., Focal Press, London.

These processes can be grouped in the follow categories: cementation, electrowinning and chemical precipitation. According to the American Hospital Association Report, the electrowinning method is almost exclusively used for silver recovery from spent photographic fixer solutions. In spite of the popularity of this process, the electrowinning method has many disadvantages; i.e., cost of electricity, high capital investment, labor costs and inadequate silver recovery.

More efficient silver recovery can be obtained by chemical precipitation with hydrogen sulfide as disclosed in Kunda et al above. However, it requires a skilled operator to handle the toxic $H_2S$ gas and has not been used commercially. Another process, which involves the use of hydrogen sulfide to precipitate silver is disclosed in U.S. Pat. No. 4,127,639. The patent relates to precipitating silver sulfide from aqueous lead solutions obtained by hot chloride leaching of residues containing lead and silver ore. The silver can be recovered from the silver sulfide.

It has been known for some time to use sodium sulfide to precipitate silver sulfide from the thiosulfate fixing solutions, as disclosed in U.S. Pat. No. 1,446,405, the sodium sulfide being less hazardous to handle. An improvement on this process is disclosed in U.S. Pat. No. 3,832,453 which discloses the use of sodium sulfide in a static mixer device which passes the mixture at high velocity to precipitate silver sulfide particles from the fixer solution.

It has been subsequently discovered, as disclosed in U.S. Pat. No. 4,437,889, that nitric acid may be added to photographic waste to precipitate from the waste solutions a residue which may be processed by heating and calcination to yield pure silver. The photographic fixer solution is heated to a temperature in the range of 45° to 65° C. With agitation, nitric acid is added at a 65% concentration and having a specific density of 1.4 grams per milliliter. A heavy loading of nitric acid is used which is considerably in excess of the amount of photographic liquid waste. With continued heating, the mixture is allowed to stand for digestion and the precipitate filtered from the mixture. The residue is then heated to a temperature in the range of 600° to 700° C. and then further fused in a graphite crucible at temperatures of 900° to 1000° C. to yield silver. This process for isolating silver from fixer solutions is energy intensive and requires large quantities of nitric acid. Furthermore, the recovered silver has a purity in the range of 99.5% and hence has to be further refined before it can be reused, since desired silver purity is usually in excess of 99.9%.

There is, therefore, a need for a safe, simple and inexpensive silver recovery process that can be used by small hospitals, photoprocessing labs in rural areas and like facilities.

SUMMARY OF THE INVENTION

According to an aspect of this invention, in a process for recovering silver from a standard spent photographic treatment solution, nitric acid is mixed with a quantity of the treatment solution to precipitate from the solution silver sulfide. The precipitate is then converted to silver. The improvement comprises mixing in accordance with a ratio of, or its equivalent, less than two parts of concentrated nitric acid solution of approximately 15.7 molar with more than ten parts of the standard treatment solution to precipitate out of the solution a solid residue which includes silver sulfide and sulfur.

According to another aspect of the invention, the process may be carried out at room temperature and use nitric acid solution at quantities of 0.5 to 1.5 parts per ten parts of the spent photographic treatment solution.

BRIEF DESCRIPTION OF THE DRAWINGS

Preferred embodiments of the process of this invention are exemplified in the flow charts.

DETAILED DESCRIPTION OF PREFERRED EMBODIMENTS

Photographic spent solutions are commonly referred to as fixer solutions, such as obtained from black and white photography processing and x-ray processing, and bleach solutions, such as obtained from color film processing. Both of these spent photographic solutions contain silver which have a high content of thiosulfate salts and sulphite salts. In addition, the fixer solution contains a small quantity of acidic acid, boric acid and aluminum salt, while the bleach solution contains sodium-iron EDTA salt and sodium thiocyanide. The makeup of the fixer and bleach solutions is fairly consistent, because the same processing technique is used in most commercial operations. Hence, such solutions are referred to as standard spent photographic treatment solutions. A typical analysis for the fixer and bleach solutions are as follows:

TABLE 1
ANALYSES OF SPENT PHOTOGRAPHIC SOLUTIONS

| Type | Analyses (g/L) | | | | | |
|---|---|---|---|---|---|---|
| | Ag | S | S(SO$_4$) | S(S$_2$O$_3$) | Fe | pH |
| Fixer | 5.9 | 48.5 | 9.1 | 39.4 | — | 5.2 |
| Bleach | 2.3 | n/a | n/a | n/a | 7.7 | 7.5 |

It was unexpected to find that nitric acid could be used to precipitate from a spent photographic solution silver sulfide. It has been commonly thought that nitric acid was a good solvent for silver metal and for most of the silver salts such as silver nitrate. It has been discovered that, in using nitric acid to precipitate silver from spent photographic solutions, considerably less quantities of nitric acid may be used than was thought necessary in the prior art at solution temperatures approximating room temperature and above, up to for example 95° C. This preferred range is from approximately 20° C. up to 50° C. It has been found that less than two parts of commercially pure concentrated nitric acid solution (15.7M), or its equivalent concentration, is all that is required to precipitate silver from approximately ten parts of spent photographic solution. There are no special requirements for the addition of nitric acid and preferably all of the nitric acid to be used in causing precipitation may be added at the start of the nitric acid treatment of the spent photographic solutions.

Figure 4:
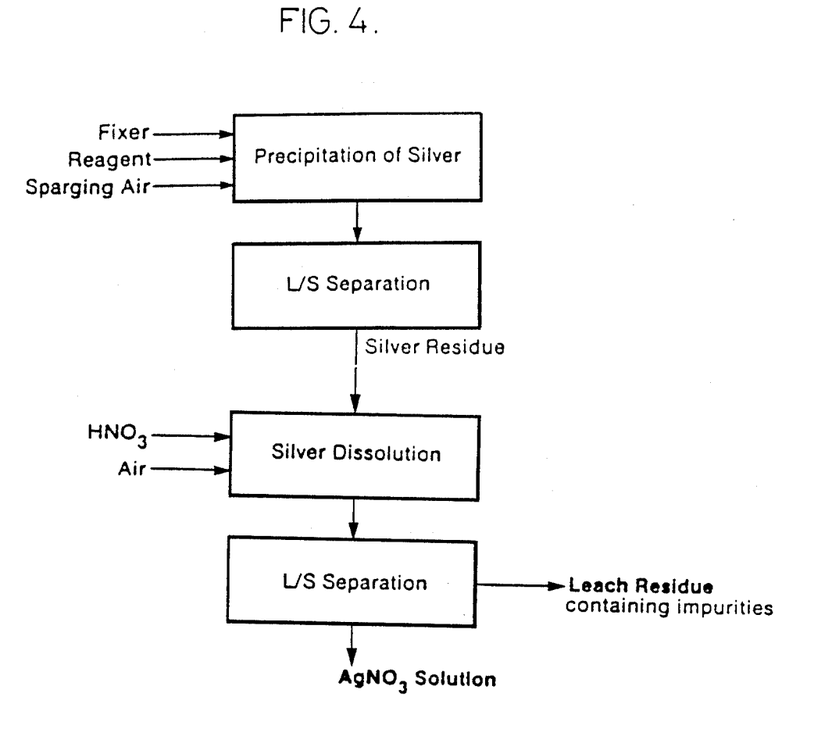
FIGS. 4 and 5 are flow sheets showing different methods of recovering silver from spent photographic solutions in accordance with preferred embodiments of this invention.
Figure 5:
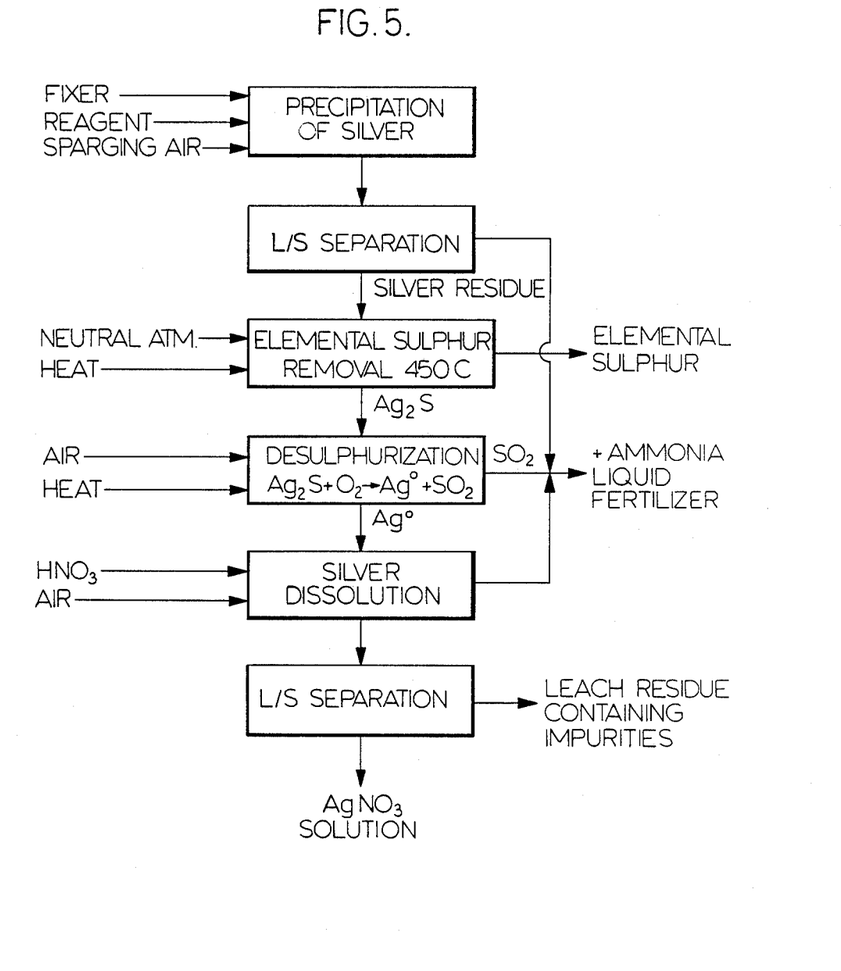

With reference to FIG. 4, the fixer solution is added to a reactor vessel to which the reagent, nitric acid is added within the prescribed range in terms of ratio of concentrated nitric acid (15.7M) to fixer solution or concentration equivalents thereof. For example, a greater quantity of a diluted solution of nitric acid may be used instead of the concentrated HNO$_3$ to provide the equivalent of the ratio based on concentrated HNO$_3$. Sparging air is preferably used to provide agitation in the reactor. Agitation is continued for approximately one to two hours during which the residue is formed which consists of sulfur and silver sulphide. A filtration step is used to separate the solid residue from the liquid. The liquid is then either disposed of or may be reacted with ammonia to form a liquid fertilizer. The silver residue is then reacted with nitric acid with agitation by air to produce soluble silver nitrate which is recovered by filtering out the unleached residue and disposing of same.

It has been observed that the addition of nitric acid to the spent photographic solution forms initially a yellow precipitate. After about five minutes, the precipitate begins to darken and becomes a dark grey. At the same time, evolution of SO$_2$ is evident. Based on these visual observations and analysis of the reactive solution, it is postulated that the following reactions take place when nitric acid is added to the fixer solution containing the thiosulfate:

$$Na_2S_2O_3 + 2\ HNO_3 \rightarrow 2\ NaNO_3 + SO_2\uparrow + S^\circ + H_2O \quad (1)$$

$$3\ Na_2S_2O_3 + 4\ HNO_3 \rightarrow H_2S + Na_2S_4O_6 + 4\ NaNO_3 + H_2O + SO_2\uparrow \quad (2)$$

$$2\ AgNaS_2O_3 + H_2S \rightarrow Ag_2S + Na_2S_2O_3 + SO_2\uparrow + S^\circ + H_2O \quad (3)$$

Based on this proposed series of chemical reactions, the products are sulfur dioxide, elemental sulfur, silver sulfide and sodium polythionic salt. The residue, which is then filtered from the fixer solution, is a combination of silver sulfide and sulfur. The residue may be processed by the addition of nitric acid to bring into the solution the silver as silver nitrate, which may then be separated from the remaining solid residue mostly sulfur. The residue normally comprises 80% to 90% elemental sulfur and 10% to 20% silver sulphide. The direct leaching of this residue with nitric acid provides for approximately 90% recovery of silver. It is appreciated that an alternative approach may be employed to recover the silver and separate it from the elemental sulfur in the precipitated residue. Elemental sulfur may be separated from the residue by incineration, evaporation, pelletization in aqueous system above the melting point of sulfur, filtration of molten sulfur or extraction of sulfur with ammonium sulfide solution which has a very high solubility for elemental sulfur. The residues from the fixer solution can be subjected to heat treatment in an air atmosphere at a temperature in the range of 400° to 600° C. On heating the residue to a temperature of approximately 550° to 600° C., the silver sulfide is oxidized and converted to metallic silver. The silver residue is then leached with the nitric acid to yield a high purity silver nitrate solution.

It has been found that silver residue produced by the reaction of a fixer or fixer-bleach solution with nitric acid provides for good settling and filtration properties. The major components of this residue are elemental sulfur and silver sulfide. Under proper conditions, up to 99.9% recovery can be obtained and silver in the effluent solution can be lowered to 0.001 grams per liter. When it is desired to remove sulfur from the residue by heat treatment, the silver residue calcined at 600° C. may be rapidly dissolved in nitric acid. The leaching with nitric acid is in accordance with the following chemical reactions:

$$6\ Ag + 8\ HNO_3 \rightarrow 6\ AgNO_3 + 2\ NO + 4\ H_2O \qquad (4)$$

$$2\ NO + 1.5\ O_2 + H_2O \rightarrow 2\ HNO_3 \qquad (5)$$

In this process, nitric acid is regenerated in yielding silver nitrate in solution which can be treated after the precipitates have been filtered to yield silver with a purity at least in the range of 99.9% or greater.

The silver can be recovered from the solution of silver nitrate and is reacted with sulfuric acid to produce silver sulfate which can be readily carried out at room temperature. The precipitated silver sulfate can be converted to metallic silver by reacting the silver sulfate with sodium carbonate at temperatures in excess of 500° C. to form silver carbonate. With continued heating in the range of 500° to 600° C., the silver carbonate decomposes to silver oxide. The silver oxide, in turn, decomposes to metallic silver which, when the charge is cooled, provides a mass of silver powder. Other steps for isolating silver from its salts is disclosed in Kunda, W. "Treatment of Complex Silver Arsenide Concentrate in Nitric Acid System" Canadian Journal of Chemical Engineering, 59 (1981) 347–56, and in Kunda, W. "Hydrometallurgical Process for Recovery of Silver from Silver Bearing Materials", Hydrometallurgy 7 (1981), 77–97.

Preferred embodiments of the invention are demonstrated in the following Examples which are not intended to be limiting in any way to the scope of the appended claims.

EXAMPLE 1

Figure 2A:
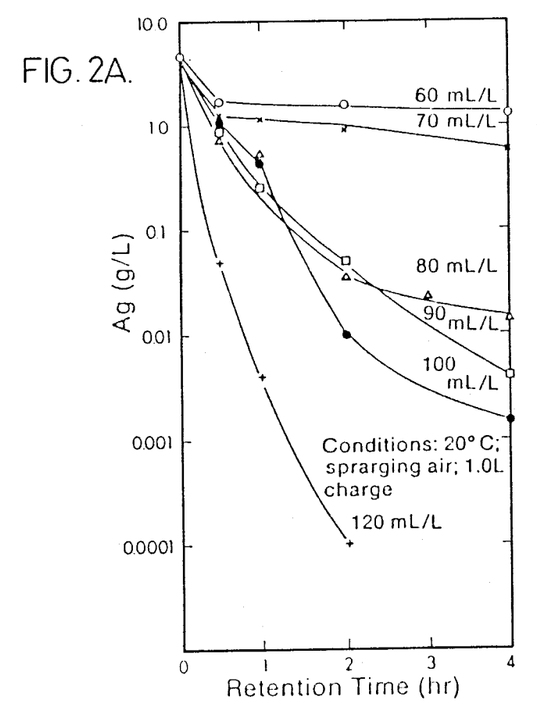
FIGS. 2A, 2B, 2C and 2D illustrate the results of stripping silver from photographic spent solutions under various conditions of nitric acid concentration, rate of addition to the solution and effect of agitation.
Figure 2B:
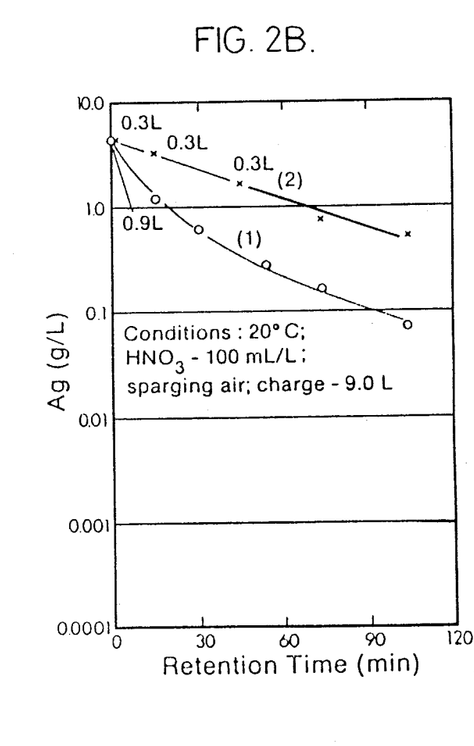

A fixer solution of Table 1 was treated with nitric acid reagent for stripping silver from the fixer solution. Various quantities of nitric acid in the fixer solution were tried to determine the effect of the quantity of concentrated nitric acid reagent in precipitating and removing silver from the solution. A 15.7 molar solution of concentrated nitric acid was used in quantities varying from 60 ml per liter of fixer solution up to 120 ml per liter of solution. As shown in FIG. 2A, the increasing concentration increased the rate at which silver was removed from the solution thereby precipitating it out of solution as a silver sulfide. At a concentration of 100 ml of concentrated nitric acid per liter of fixer solution (or 1.5 moles $HNO_3/l$), the concentration was reduced to about 0.001 g/l of silver remaining in the solution within approximately one hour. The timing and the addition of the nitric acid reagent was investigated to reveal that addition of the desired amount of nitric acid reagent at the beginning of treating the solution had a slightly more favorable effect in removing silver from the solution than adding the nitric acid in sequential amounts, as shown in FIG. 2B. Hence although it is not critical to add all of the nitric acid at the start, a slight improvement in stripping efficiency can be realized.

Figure 2C:
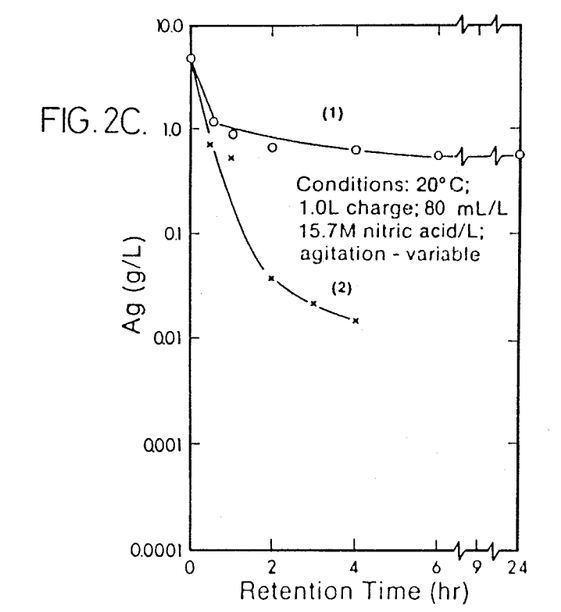
Figure 2D:
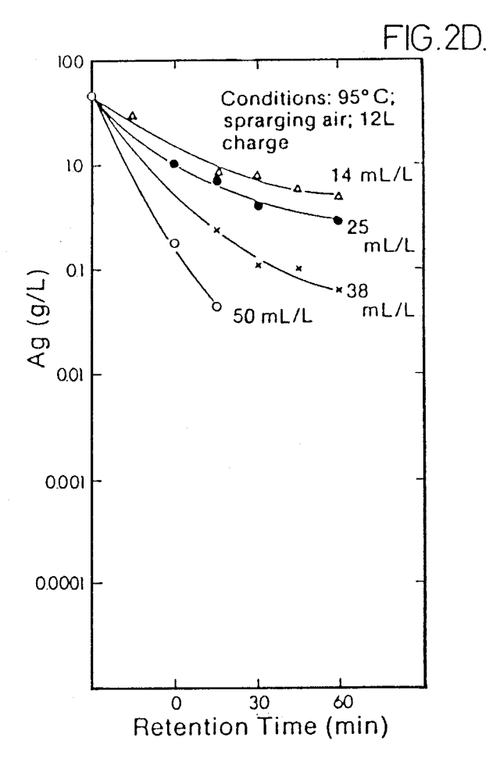
Figure 3:
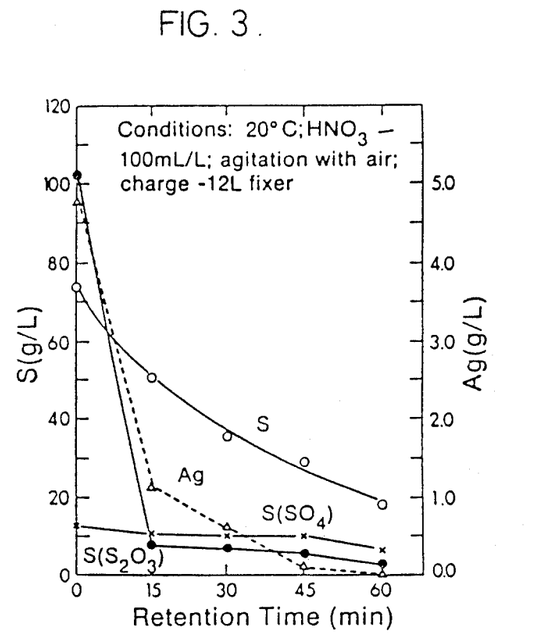
FIG. 3 illustrates the changes in solution composition during the stripping of silver from a fixer solution with nitric acid.

The effect of agitation on the rate of precipitation of silver sulfide from the treatment solution is demonstrated in FIG. 2C. With no agitation, the removal of silver falls off compared to increased rate of removal in less time when agitation is present. The effect of temperature in the silver stripping by use of nitric acid was investigated. As shown in FIG. 2D, silver stripping carried out at temperatures of up to 95° C. resulted in acceptable rates of removal for a lesser quantity of nitric acid used compared to the results shown in FIG. 2A. Higher temperatures beyond 95° C. should be avoided because nitric acid reacts with precipitated silver sulfide to dissolve the silver.

Similar tests were conducted on combination of fixer-bleach solution and the bleach solution on its own. It was found that the iron in the bleach solution did not affect the silver precipitate and did not precipitate with the silver, so that the residue consisted of sulfur and silver sulfide which leads to the economic removal of the silver from the residue.

EXAMPLE 2

The characteristics of the residue precipitated by the addition of nitric acid was analyzed in determining the effectiveness in the stripping of silver from the fixer solution with respect to concentration of nitric acid, temperature and agitation. The results of the investigations are set out in Table 2.

TABLE 2

Stripping of Silver from Fixer Solutions with Nitric Acid; Effect of (a) Nitric Acid, (b) Temperature and (c) Agitation on Silver Recovery under Various Operating Conditions

| Investigated Variables | Conditions | | | Charge (L) | | Products | | | | | Silver Recovery (%)[3] |
|---|---|---|---|---|---|---|---|---|---|---|---|
| | | | | | | Filtrate | | Silver Residue | | | |
| | Time (hr) | Temp. (°C.) | Agitation | Fixer | $HNO_3$ (15.7 M) | Ag (g/L) | pH | Weight (g) | | Comp. (%) | |
| | | | | | | | | Dried | Calcined[1] | $Ag_2S^2$ | S° |
| Fixer-Head | | | | | | 4.78 | 5.1 | | | | |
| $HNO_3$ addition | 6 | 20 | air | 1.0 | 0.06 | 0.96 | 2.8 | 13.1 | 3.84 | 29.1 | 70.6 | 80.0 |
| | 6 | 20 | air | 1.0 | 0.07 | 0.47 | 2.5 | 15.7 | 4.58 | 29.2 | 70.8 | 90.2 |
| | 4 | 20 | air | 1.0 | 0.08 | 0.016 | 1.8 | 18.3 | 4.35 | 23.8 | 76.3 | 99.7 |
| | 6 | 20 | air | 1.0 | 0.09 | 0.002 | 1.4 | 19.6 | 5.21 | 26.6 | 73.4 | 99.9 |
| | 6 | 20 | air | 1.0 | 0.10 | 0.023 | 0.9 | 19.7 | 2.96 | 15.0 | 85.6 | 99.5 |

TABLE 2-continued

Stripping of Silver from Fixer Solutions with Nitric Acid; Effect of (a) Nitric Acid, (b) Temperature and (c) Agitation on Silver Recovery under Various Operating Conditions

| Investigated Variables | Conditions | | | Charge (L) | | Products | | | | | | |
|---|---|---|---|---|---|---|---|---|---|---|---|---|
| | | | | | | Filtrate | | Silver Residue | | | | |
| | Time (hr) | Temp. (°C.) | Agita-tion | Fixer | HNO$_3$ (15.7 M) | Ag (g/L) | pH | Weight (g) | | Comp. (%) | | Silver Recovery (%)[3] |
| | | | | | | | | Dried | Calcined[1] | Ag$_2$S[2] | S° | |
| | 6 | 20 | air | 1.0 | 0.12 | 0.001 | 0.5 | 19.7 | 5.28 | 26.8 | 73.2 | 99.9 |
| Temperature | 4 | 20 | air | 1.0 | 0.08 | 0.016 | 1.8 | 18.3 | 4.35 | 23.8 | 76.3 | 99.7 |
| | 2 | 35 | air | 1.0 | 0.08 | 0.038 | 2.2 | 17.4 | 2.80 | 16.1 | 83.9 | 99.2 |
| | 6 | 50 | air | 1.0 | 0.08 | 0.003 | 2.3 | 17.9 | 5.21 | 29.1 | 72.3 | 99.9 |
| Agitation | 96 | 20 | no | 1.0 | 0.08 | 0.265 | 0.9 | 15.5 | 5.28 | 24.1 | 77.3 | 94.5 |
| | 4 | 20 | air | 1.0 | 0.08 | 0.016 | 1.8 | 18.3 | 4.35 | 23.8 | 76.3 | 99.7 |

[1]Calcined at 500° C. in an air atmosphere to remove S°
[2]Residue left after calcining was Ag$_2$S with some impurities
[3]Recovery calculated on solution basis

EXAMPLE 3

The composition of silver residue precipitated from a fixer solution and a mixture of a fixer and bleach solution were investigated, the results of which are set out in Table 3.

TABLE 3

Typical Composition of Silver Residues Stripped with Nitric Acid from: (a) Fixer Solution and (b) Mixture of Fixer and Bleach Solution

| Origin of Silver Residue | Heat Treatment[1] | | Weight loss (%) | Composition of Head Residue (%) | |
|---|---|---|---|---|---|
| | None (g) | 300° C. (g) | | Ag$_2$S | S° |
| Fixer Solution | 100 | 25 | 75 | 25 | 75 |
| Fixer-Bleach | 100 | 8 | 92 | 8 | 92 |

[1]Heat treatment at 300° C. in an air atmosphere will remove sulphur as sulphur dioxide.

EXAMPLE 4

To 1.8 liters of fixer solution, 0.18 liters of nitric acid was added. Air at 0.225 liters per minute was passed through the solution for purposes of agitation. The exhausted gas was bubbled through 0.059 molar ammonia solution to absorb produced SO$_2$. The products of the reaction (a) silver residue; (b) filtrate; (c) absorption solution were analyzed. The results of the analysis are shown in Table 4.

The results reveal that only 36% sulfur present in the head solution remained in the filtrate. 33% sulfur was removed from the system as SO$_2$ and absorbed in ammonia and 31% of the sulfur was found in the residue. Only 0.34 moles of sulfur remain in the filtrate with 1.1 mole of nitrate mostly in the form of nitric acid. After the effluent solution was neutralized with the ammonia to a pH 7 the final solution contained (g/l) 76.0 NH$_4$NO$_3$; 48.3 Na$_2$SO$_4$ and 11.9 NaNO$_3$. This neutralization of the filtrate with ammonia produces a liquid fertilizer which is rich in nitrogen as shown in Table 5.

TABLE 4

Distribution of Sulphur among Filtrate, Absorption Solution and Silver Residue
Conditions: 20° C.; 100 mL/L HNO$_3$; agitation with air

| Products | Quantity | Analyses (g/L or %) | | | | | | | S Distribution | | Form of Sulphur in the Products |
|---|---|---|---|---|---|---|---|---|---|---|---|
| | | S | S(SO$_4$) | S(S$_2$O$_3$) | S(S$^=$) | S(SO$_2$) | S° | pH | (g) | (%) | |
| Fixer-Head | 1.8 L | 44.9 | 2.3 | 42.6 | — | — | — | 5.0 | 80.0 | — | Na$_2$S$_2$O$_3$, Na$_2$SO$_3$ |
| Filtrate | 1.98 L | 14.5 | 4.9 | n/a | — | 9.6 | — | 1.1 | 28.7 | 36 | Na$_2$SO$_4$, Na$_2$SO$_3$ |
| Absorption Solution | 0.8 L | 32.5 | 1.6 | n/a | — | 11.2 | — | 11.9 | 26.0 | 33 | (NH$_4$)$_2$SO$_3$ |
| Silver Residue | 29.7 g | 86.0 | — | — | 0.41 | — | 85.6 | — | 25.2 | 31 | S°, Ag$_2$S |

TABLE 5

Neutralization of Silver Free Effluent Fixer Solution with Ammonia

| | Charge (mL) | | Analysis (mole/L) | | | |
|---|---|---|---|---|---|---|
| | Spent Fixer | Ammonia 4 M Cumulative | S | HNO$_3$ | NH$_3$ | pH |
| Spent fixer | 1,000 | 0 | 0.45 | 1.41 | 0 | 0.8 |
| Ammonia, 4 M | | 250 | 0.36 | 1.14 | 0.80 | 3.7 |
| | | 310 | 0.34 | 1.09 | 0.95 | 7.0 |
| Total | 1,000 | 310 | | | | |

| Composition of neutralized spent fixer solution: | | |
|---|---|---|
| Salt | mole/L | g/L |
| NH$_4$NO$_3$ | 0.95 | 76.0 |
| Na$_2$SO$_4$ | 0.34 | 48.3 |
| NaNO$_3$ | 0.14 | 11.9 |
| Total | | 136.2 |

EXAMPLE 5

Silver residues from the fixer and from the blend fixer and bleach solutions were subjected to heat treatment in an air atmosphere at 400° C., 550° C. and 600° C. The heat treated residues were then weighed and leached in 7 molar nitric acid solutions and also analyzed by x-ray diffraction. The results of these tests are summarized in Table 6.

The results show that the untreated residue was composed of sulfur and silver sulfide. After heating the residue to 400° C., elemental sulfur was completely removed leaving only silver sulfide. Further heating of the residue to 600° C. converted the silver sulfide to metallic silver. During heat treatment, the silver residue was upgraded to 88% and 65%.

TABLE 6

Leaching of Calcined Silver Residue in Nitric Acid; Effect of Calcining Temperature on Silver Extraction
Conditions: Calcining: 400° C. to 600° C.; 6 hr; air atmosphere. Leaching: 2 hr at 100° C. in 7 M $HNO_3$.
Head Materials: (a) Silver residue from fixer solution - 23.4% $Ag_2S$ and 79.6% S°. (b) Silver residue from fixer and bleach solution (1:1).

| Head Material | Calcining Temp. (°C.) | Wt. Changes After Treatment (g) | | | Ag in Calcined Residue (%) | Silver in Head (g) | Silver in Leach Solution (g) | Silver Extraction (%) | X-ray Diffraction of Treated Residue |
|---|---|---|---|---|---|---|---|---|---|
| | | Charge | After Treatment | After Leaching | | | | | |
| a | —[1] | 20.0 | — | 3.52 | 20.2 | 4.31 | 4.03 | 93.5 | S°, $Ag_2S$ |
| a | 400 | 20.0 | 5.24 | 0.173 | 80.7 | 4.31 | 4.23 | 98.1 | $Ag_2S$ |
| a | 550 | 20.0 | 5.18 | 0.336 | 81.7 | 4.31 | 4.23 | 98.1 | $Ag_2S$, Ag° |
| a | 600 | 20.0 | 4.96 | 0.163 | 87.0 | 4.31 | 4.31 | 100.0 | Ag° |
| b | — | 20.0 | — | 14.57 | 7.5 | 1.49 | 1.47 | 98.0 | S°, $Ag_2S$ |
| b | 400 | 20.0 | 7.76 | n/a[2] | n/a | 1.49 | n/a | n/a | $Ag_2S$ |
| b | 550 | 20.0 | 2.87 | 1.48 | 51.6 | 1.49 | 1.23 | 82.6 | $Ag_2S$, Ag° |
| b | 600 | 20.0 | 2.40 | 0.09 | 62.1 | 1.49 | 1.49 | 100.0 | Ag° |

[1] Not calcined
[2] Slurry impossible to filter

EXAMPLE 6

The extraction of silver from the treatment solution by nitric acid precipitation of silver sulfide is insignificantly affected by the strength of nitric acid used. Between 2 to 8 molar concentration for nitric acid in a pulp density of 100 to 200 g/l of solids demonstrated, as shown in the following Table 7, that satisfactory recovery of silver can be achieved.

TABLE 7

Leaching of Silver Residue (Fixer) in Nitric Acid; Investigated Variables: (a) Molarity of Nitric Acid and (b) Pulp Density
Conditions: 100° C.; 2 hr; charge: 100 to 200 g/L silver residue and 100 mL nitric acid of various strengths

| investigated Variables | Conditions | | Silver Residue (g) | | | Silver in Products (g) | | | Ag Extraction (%) |
|---|---|---|---|---|---|---|---|---|---|
| | Molarity of $HNO_3$ | Ag Residue (g/L) | Head | Leach Residue | Calcined at 400° C. | Leach Solution | Leach Residue | Total | |
| Molarity of $HNO_3$ | 1.96 | 100 | 20.0 | 15.9 | 1.00 | 3.5 | 0.69 | 4.19 | 83.5 |
| | 3.92 | 100 | 20.0 | 15.5 | 0.74 | 3.9 | 0.47 | 4.37 | 89.2 |
| | 5.88 | 100 | 20.0 | 14.9 | 0.64 | 4.1 | 0.42 | 4.52 | 90.5 |
| | 7.85 | 100 | 20.0 | 14.7 | 0.63 | 4.1 | 0.35 | 4.45 | 92.1 |
| Pulp Density | 5.88 | 100 | 20.0 | 14.9 | 0.64 | 4.1 | 0.42 | 4.52 | 90.5 |
| | 5.88 | 150 | 30.0 | 22.5 | 1.00 | 6.0 | 0.61 | 6.61 | 90.8 |
| | 5.88 | 200 | 40.0 | 30.3 | 1.47 | 7.8 | 0.93 | 8.73 | 89.3 |

EXAMPLE 7

The silver can be leached from either the untreated or treated silver residues as shown in Table 7 of Example 5. The calcined silver residue consisted of very fine silver powder contaminated with a small quantity of impurities originating in the feed material or picked up during processing. A dissolution test carried out at 45° C. on silver residue, calcined at 600° C. gave very rapid dissolution of silver. The initial dissolution rate during the first 20 minutes was found to be 1100 g/l per hour which in the succeeding 140 minutes decreased to 140 g/l per hour. The final leach solution contained about 550 g/l of silver. Sparging of air into the solution regenerated nitric acid according to the reactions set out in the above chemical reaction schemes for 4 and 5. The rate of silver dissolution was not affected by air. A highly concentrated silver nitrate solution is prepared which can be a starting material for the production of silver bullion, silver salts and silver powder.

According to this invention, silver can be recovered from photographic spent solutions by reaction of thiosulfate salts with nitric acid. The function of nitric acid is to promote the decomposition of thiosulfate salts to sulfur dioxide, elemental sulfur and a small quantity of hydrogen sulfide which is responsible for the precipitation of the silver. Accordingly, with this invention, minimal amount of nitric acid is required. The resulting silver residue consists of elemental sulfur and silver sulfide. Desired conditions for stripping the silver from solution to a concentration of 0.001 g/l are 90 to 100 ml of concentrated nitric acid per litre of fixer solution added at the start with agitation and a retention time of 1 hour. The temperature range for the reaction is normally from 20° to 95° C., where the preferred range is from 20° to 50° C. The discharge slurry may be stored for several hours to promote further silver precipitation.

The silver residue can be treated either with nitric acid to recover silver or can be heat treated at 450° C. to recover elemental sulfur or calcined at 600° C. to remove also all sulfur as $SO_2$ and convert the silver to the metallic form. Silver is recovered as a high grade silver nitrate solution by adding nitric acid to the calcined material or to the residue as untreated. An additional advantage of the process is the recovery of effluent solutions and gases which can be made into fertilizer by reaction with ammonia. This offsets the cost of nitric acid and ammonia reagents used. An efficient energy conserving process is provided by this invention for recovering in an efficient manner high quality silver from photographic spent solution.

Although preferred embodiments of the invention have been described herein in detail, it will be understood by those skilled in the art that variations may be made thereto without departing from the spirit of the invention or the scope of the appended claims.

What is claimed is:

1. In a process for recovering silver from a standard spent photographic treatment solution comprising mixing nitric acid with a quantity of said treatment solution to precipitate from said solution silver sulfide and converting said precipitate to silver, the improvement comprising mixing in accordance with a ratio of or its equivalent less than two parts of concentrated nitric acid solution of approximately 15.7M with more than ten parts of said standard treatment solution to precipitate out of said solution a solid residue which includes silver sulfide and sulfur.

2. In a process of claim 1, said improvement further comprising mixing said nitric acid with said treatment solution at room temperature up to approximately 50° C.

3. In a process of claim 1, said improvement further comprising mixing less than 1.5 parts of said nitric acid with 10 parts or more of said treatment solution.

4. In a process of claim 3, said improvement further comprising using more than 0.3 parts of said nitric acid.

5. In a process of claim 1, said improvement further comprising leaching said solid residue with nitric acid to produce silver nitrate.

6. In a process of claim 5, conducting said leaching step at elevated temperature.

7. In a process of claim 1, said improvement further comprising heating said solid residue to an elevated temperature sufficient to remove sulfur from and oxidize silver sulphide to silver in said residue, leaching with nitric acid the heat treated solid residue to remove silver from said solid residue as soluble silver nitrate, treating said silver nitrate to yield purified silver of a purity in excess of 99.9%.

8. In a process of claim 3 or 4, said improvement further comprising mixing said nitric acid solution with said treatment solution at room temperature.

9. In a process of claim 1 or 2, said treatment solution is a fixer solution.

10. In a process of claim 1 or 2, said treatment solution is a mixture of fixer and bleach solutions.

11. In a process of claim 1 or 2, said mixing is accompanied by mechanical or air agitation of said solution.

12. In a process of claim 1 or 2, said filtered treatment solution containing less than 0.001 gm of silver per liter of solution.

13. In a process of claim 1, said improvement further comprising adding ammonia to said filtered treatment solution.

14. In a process of claim 3, said solid residue comprising approximately 75% to 90% by weight sulfur and 10% to 25% by weight of silver sulfide.

* * * * *